(12) United States Patent
Nezaki et al.

(10) Patent No.: US 11,590,928 B2
(45) Date of Patent: Feb. 28, 2023

(54) CONTROL DEVICE FOR SEAT BELT OF VEHICLE

(71) Applicant: Toyota Jidosha Kabushiki Kaisha, Toyota (JP)

(72) Inventors: Takuya Nezaki, Mizunami (JP); Motoki Sugiyama, Kasugai (JP); Fumihito Komeno, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 415 days.

(21) Appl. No.: 16/597,918

(22) Filed: Oct. 10, 2019

(65) Prior Publication Data

US 2020/0114865 A1 Apr. 16, 2020

(30) Foreign Application Priority Data

Oct. 12, 2018 (JP) .............................. JP2018-193838

(51) Int. Cl.
*B60R 22/40* (2006.01)
*B60W 30/095* (2012.01)
*B60W 30/085* (2012.01)

(52) U.S. Cl.
CPC .......... *B60R 22/40* (2013.01); *B60W 30/085* (2013.01); *B60W 30/0953* (2013.01)

(58) Field of Classification Search
CPC ................ B60R 22/40; B60R 21/0134; B60R 2021/01272; B60R 22/46; B60R 2022/4666; B60W 30/0953; B60W 30/085; B60W 30/12; B60W 10/20

USPC ......................................................... 203/806
See application file for complete search history.

(56) References Cited

U.S. PATENT DOCUMENTS

| | | | |
|---|---|---|---|
| 2006/0047388 A1* | 3/2006 | Oka ...................... | B60R 21/013 701/41 |
| 2008/0221758 A1* | 9/2008 | Bernzen .............. | B60R 21/0132 701/45 |
| 2009/0021358 A1 | 1/2009 | Lee et al. | |
| 2013/0079997 A1 | 3/2013 | Bunker | |
| 2018/0229726 A1* | 8/2018 | Ikeda .................... | G05D 1/0246 |
| 2018/0257646 A1* | 9/2018 | Takeuchi ............ | G06K 9/00825 |
| 2019/0176736 A1* | 6/2019 | Jang ........................ | B60R 22/48 |
| 2020/0255009 A1* | 8/2020 | Ikeda .................... | B60W 10/18 |

FOREIGN PATENT DOCUMENTS

| | | |
|---|---|---|
| CN | 102730001 A | 10/2012 |
| DE | 602005001374 T2 | 2/2008 |
| DE | 102007057752 A1 | 1/2009 |

(Continued)

*Primary Examiner* — Scott A Reinbold
(74) *Attorney, Agent, or Firm* — Dinsmore & Shohl LLP

(57) ABSTRACT

A control device for a seat belt of a vehicle includes a retracting unit configured to retract the seat belt, a departure detection unit configured to detect a departure of the vehicle from a lane; a vehicle speed sensor configured to measure a vehicle speed; and an electronic control unit configured to operate the retracting unit when both a first condition and a second condition are satisfied. The first condition is a condition that the departure detection unit detects the departure of the vehicle from the lane, and the second condition is a condition that the vehicle speed is equal to or higher than a prescribed speed, and the electronic control unit is configured not to operate the retracting unit when the first condition is satisfied and the second condition is not satisfied.

20 Claims, 13 Drawing Sheets

(56) References Cited

FOREIGN PATENT DOCUMENTS

| | | |
|---|---|---|
| DE | 102008050316 A1 | 5/2010 |
| JP | 2006-069322 A | 3/2006 |
| JP | 2006-168617 A | 6/2006 |

* cited by examiner

CONTROL DEVICE FOR SEAT BELT OF VEHICLE

CROSS-REFERENCE TO RELATED APPLICATIONS

This application claims priority to Japanese Patent Application No. 2018-193838 filed on Oct. 12, 2018, which is incorporated herein by reference in its entirety including the specification, drawings and abstract.

BACKGROUND

1. Technical Field

The disclosure relates to a control device for a seat belt of a vehicle.

2. Description of Related Art

Japanese Unexamined Patent Application Publication No. 2006-168617 (JP 2006-168617 A) describes a vehicle travel safety device. When the device detects a lane departure on a straight road against a driver's driving intention, tightening and loosening of a seat belt are alternately repeated as a normal alarm, thereby warning an occupant about the lane departure on the straight road. Further, when the device detects a lane departure at a curve against the driver's driving intention, increasing a seat belt tightening force and maintaining the tightening force are alternately repeated as a special alarm. This notifies the occupant of a warning about the lane departure at the curve, and the seat belt restraining force on the occupant is gradually increased.

SUMMARY

The travel safety device in JP 2006-168617 A has a configuration in which a change in the restraining state of the seat belt is triggered by a lane departure. In such a configuration, the seat belt is retracted even when the amount of lane departure is small. This may cause discomfort to the occupant who does not want excessive restraint. That is, regarding a control device for a vehicle seat belt, which retracts the seat belt based on a detection result of a lane departure, there is room for improvement to suppress discomfort to the occupant caused by restraint.

The disclosure provides a control device for a seat belt of a vehicle, which is configured to retract a seat belt based on a detection result of a lane departure from and which can suppress discomfort to the occupant caused by restraint.

A first aspect of the disclosure relates to a control device for a seat belt of a vehicle. The control device includes a retracting unit configured to retract the seat belt with a driving force of a motor, a departure detection unit configured to detect a departure of the vehicle from a lane, a vehicle speed sensor configured to measure a vehicle speed of the vehicle, and an electronic control unit configured to operate the retracting unit when both a first condition and a second condition are satisfied. The first condition is a condition that the departure detection unit detects the departure of the vehicle from the lane, and the second condition is a condition that the vehicle speed measured by the vehicle speed sensor is equal to or higher than a prescribed speed. The electronic control unit is configured not to operate the retracting unit when the first condition is satisfied and the second condition is not satisfied.

In the control device according to the above aspect, when the departure detection unit detects the departure of the vehicle from the lane and the vehicle speed measured by the vehicle speed sensor is equal to or higher than the prescribed speed, the electronic control unit operates the retracting unit. On the other hand, when the departure detection unit detects the departure of the vehicle from the lane and the vehicle speed measured by the vehicle speed sensor is lower than the prescribed speed, the electronic control unit does not operate the retracting unit. Thus, when it is not necessary to restrain an occupant in the vehicle with the seat belt, the retracting unit is not operated. Therefore, in the configuration in which the seat belt is retracted based on the detection result of the lane departure, it is possible to suppress discomfort to the occupant caused by restraint.

The control device according to the above aspect may further include an angle measurement unit configured to measure an approach angle of the vehicle toward an outside of the lane at a time of the departure of the vehicle from the lane. The electronic control unit may be configured to operate the retracting unit when all of the first condition, the second condition and a third condition are satisfied, the third condition being a condition that the approach angle measured by the angle measurement unit is equal to or larger than a prescribed angle. The electronic control unit may be configured not to operate the retracting unit when both the first condition and the second condition are satisfied and the third condition is not satisfied.

In the control device according to the above aspect, the electronic control unit operates the retracting unit when the vehicle speed of the vehicle at the time of departure from the lane is equal to or higher than the prescribed speed and the approach angle of the vehicle at the time of the departure from the lane is equal to or larger than the prescribed angle. When the vehicle speed of the vehicle at the time of departure from the lane is equal to or higher than the prescribed speed and the approach angle of the vehicle at the time of departure from the lane is smaller than the prescribed angle, the electronic control unit does not operate the retracting unit. Accordingly, when it is not necessary to restrain the occupant in the vehicle with the seat belt, the retracting unit is less likely to be operated and thus it is possible to further suppress discomfort to the occupant caused by restraint.

A second aspect of the disclosure relates to a control device for a seat belt of a vehicle. The control device includes a retracting unit configured to retract the seat belt with a driving force of a motor, a departure detection unit configured to detect a departure of the vehicle from a lane, a structure detection unit configured to detect presence or absence of a structure outside the lane, and an electronic control unit configured to operate the retracting unit when both a first condition and a second condition are satisfied. The first condition is a condition that the departure detection unit detects the departure of the vehicle from the lane, and the second condition is a condition that the structure detection unit detects the structure. The electronic control unit is configured not to operate the retracting unit when the first condition is satisfied and the second condition is not satisfied.

In the control device according to the above aspect, when the departure detection unit detects the departure of the vehicle from the lane and the structure detection unit detects the structure, the electronic control unit operates the retracting unit. On the other hand, when the departure detection unit detects the departure of the vehicle from the lane and the structure detection unit does not detect the structure, the electronic control unit does not operate the retracting unit. Accordingly, when it is not necessary to restrain the occupant in the vehicle with the seat belt, the retracting unit is less likely to be operated. Therefore, in the configuration in which the seat belt is retracted based on the detection result of the lane departure, it is possible to suppress discomfort to the occupant caused by restraint.

The control device according to the above aspect may further include a steering assist unit that assists in steering of the vehicle such that the vehicle is held within the lane. The electronic control unit may be configured not to operate the retracting unit when all of the first condition, the second condition and a third condition are satisfied. The third condition is a condition that the vehicle is allowed to return to the lane with the steering assist unit.

In the control device according to the above aspect, when the departure detection unit detects the departure of the vehicle from the lane and the structure detection unit detects the structure, the vehicle may return to the lane (the departure may be eliminated) with the steering assist by the steering assist unit. When the vehicle returns to the lane with the steering assist by the steering assist unit, there is no need to operate the retracting unit. That is, when it is not necessary to restrain the occupant in the vehicle with the seat belt, the retracting unit is less likely to be operated and thus it is possible to further suppress discomfort to the occupant caused by restraint.

A third aspect of the disclosure relates to a control device for a seat belt of a vehicle. The control device includes a retracting unit configured to retract the seat belt with a driving force of a motor, a departure detection unit configured to detect a departure of the vehicle from a lane, an acceleration sensor configured to measure an acceleration of the vehicle, and an electronic control unit configured to operate the retracting unit when both a first condition and a second condition are satisfied. The first condition is a condition that the departure detection unit detects the departure of the vehicle from the lane, and the second condition is a condition that the acceleration measured by the acceleration sensor is equal to or larger than a prescribed acceleration. The electronic control unit is configured not to operate the retracting unit when the first condition is satisfied and the second condition is not satisfied.

In the control device according to the above aspect, when the departure detection unit detects the departure of the vehicle from the lane and the acceleration measured by the acceleration sensor is equal to or larger than the prescribed acceleration, the electronic control unit operates the retracting unit. When the departure detection unit detects the departure of the vehicle from the lane and the acceleration measured by the acceleration sensor is smaller than the prescribed acceleration, the electronic control unit does not operate the retracting unit. Thus, when it is not necessary to restrain the occupant in the vehicle with the seat belt, the retracting unit is not operated. Accordingly, in the configuration in which the seat belt is retracted based on the detection result of the lane departure, it is possible to suppress discomfort to the occupant caused by restraint.

The control device according to the above aspect may further include a load sensor configured to measure a load input to the vehicle, and a pretensioner that retracts the seat belt earlier than the retracting unit does when the load measured by the load sensor exceeds a prescribed load. The electronic control unit may be configured to lower the prescribed load when the departure detection unit detects the departure of the vehicle from the lane.

In the control device according to the above aspect, when the departure detection unit detects the departure of the vehicle from the lane, the electronic control unit lowers the prescribed load. When the load measured by the load sensor exceeds the lowered prescribed load, the pretensioner retracts the seat belt earlier than the retracting unit does. Here, the prescribed load is set to a smaller value. Therefore, the pretensioner can retract the seat belt at an early stage of a collision, compared with the case where the prescribed load is maintained at the initial value. Thus, restraint performance for the occupant can be improved.

As described above, the disclosure provides a control device for a seat belt of a vehicle, which is configured to retract a seat belt based on the detection result of the lane departure and which can suppress discomfort to the occupant caused by restraint.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

Figure 1:
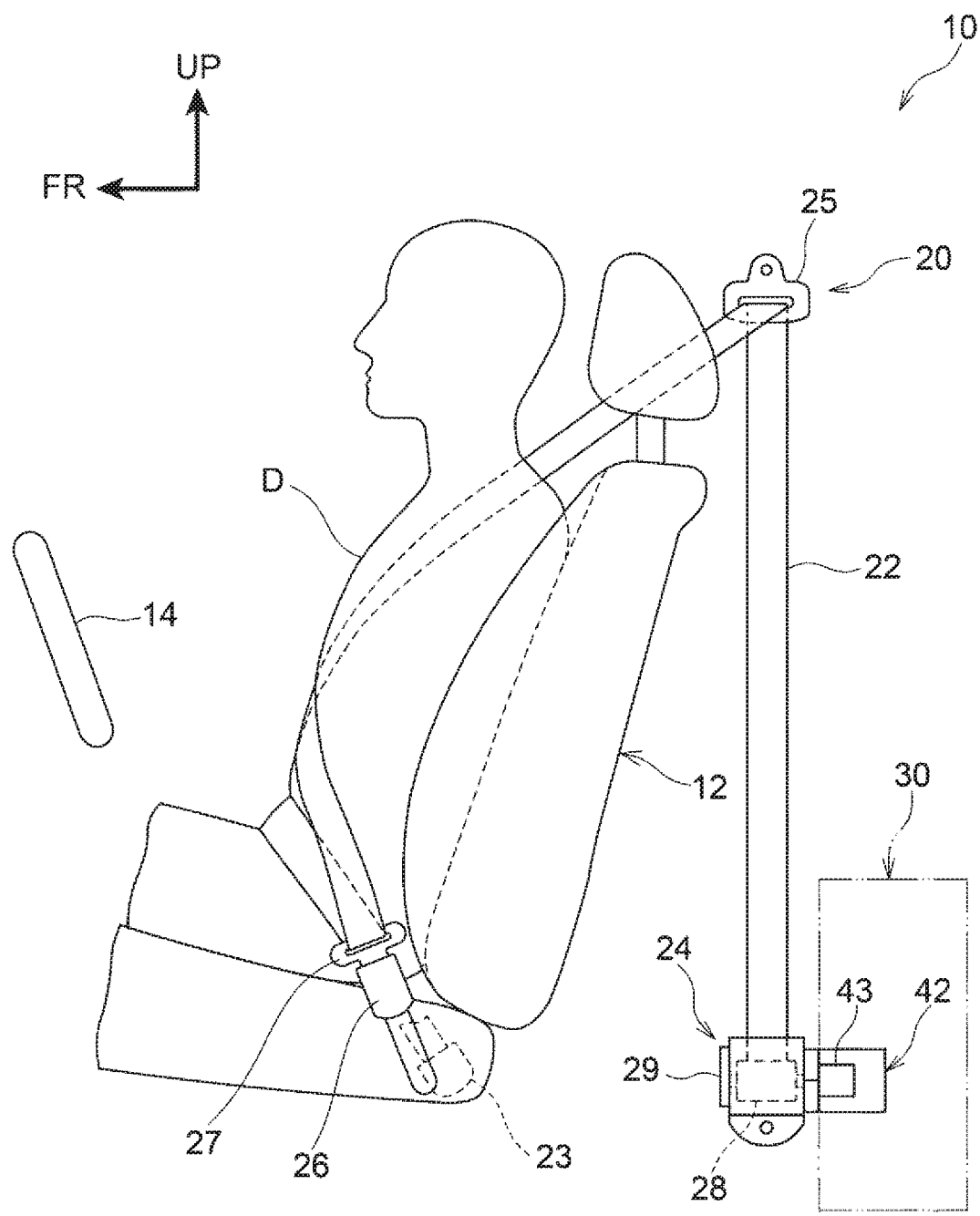
FIG. 1 is a side view showing an occupant seated on a seat and restrained by a seat belt in a vehicle in which a seat belt control device according to a first embodiment is installed.

A seat belt control device 30 serving as an example of a control device for a seat belt of a vehicle according to a first embodiment and a vehicle 10 provided with the seat belt control device 30 will be described with reference to FIGS.

1 to 4. Note that, for convenience of description, arrows UP and FR are appropriately shown in the drawings. The arrow UP represents an upward direction of the vehicle 10 and a vehicle seat 12, and the arrow FR represents a forward direction of the vehicle 10 and the vehicle seat 12. Further, in the following description, up-down, front-rear, and left-right directions represent up-down, front-rear, and left-right directions of the vehicle 10 and the vehicle seat 12 (facing a traveling direction), unless otherwise indicated.

Overall Configuration

The vehicle 10 shown in FIG. 1 includes the vehicle seat 12, a steering wheel 14, a seat belt device 20, and the seat belt control device 30 that are mounted on a vehicle body (not shown).

The vehicle seat 12 is, for example, a front seat serving as a driver's seat. An occupant D (driver) is seated on the vehicle seat 12. The steering wheel 14 serving as a steering unit is operated by the occupant D. Steering torque of the steering wheel 14 is controllable by an electronic control unit (ECU) 32 (see FIG. 2) described later.

The seat belt device 20 is provided for the vehicle seat 12. The seat belt device 20 includes a webbing 22, an anchor plate 23, a winding unit 24, a shoulder anchor 25, a buckle 26 and a tongue plate 27. The winding unit 24 has a spool 28 for winding the webbing 22 and an urging unit 29 for urging the spool 28 using a spring (not shown) in a direction in which the webbing 22 is wound.

The webbing 22 is an example of the seat belt. One end of the webbing 22 is attached to a side of the vehicle seat 12 via an anchor plate 23. The other end of the webbing 22 is engaged with the spool 28. An intermediate portion of the webbing 22 is inserted through the shoulder anchor 25 and folded back. The buckle 26 is provided on a side of the vehicle seat 12 opposite from the anchor plate 23 side. The tongue plate 27 is slidably provided on the webbing 22. The tongue plate 27 is engageable with the buckle 26.

In the seat belt device 20, the tongue plate 27 is engaged with the buckle 26 with the occupant D seated on the vehicle seat 12, whereby the webbing 22 is attached to the occupant D. In other words, the occupant D is restrained by the seat belt device 20.

Lanes and Structures

Figure 3:
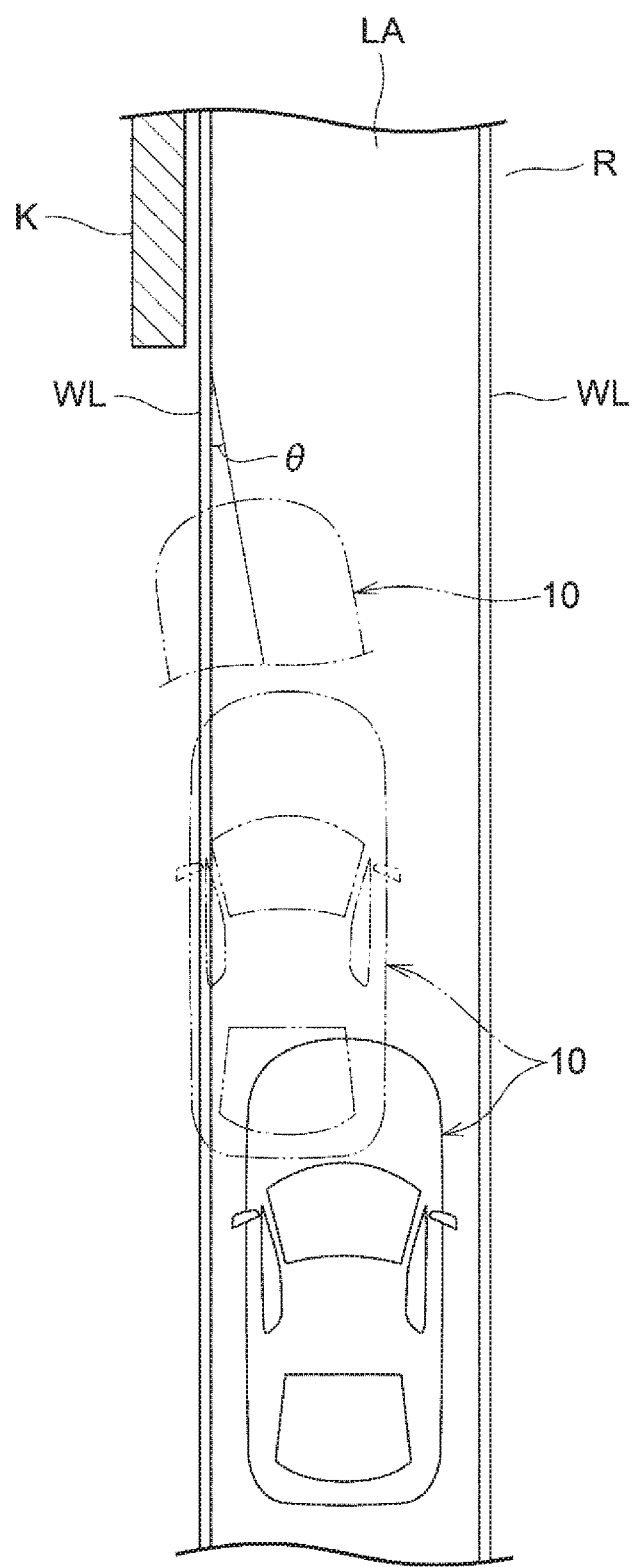
FIG. 3 is a schematic plan view showing a state in which the vehicle 10 in FIG. 1 is traveling within a lane and a state in which the vehicle 10 is departing from the lane.

FIG. 3 shows a lane LA of a road R, the vehicle 10, and a structure K. On the road R, two lane markings WL serving as boundary lines are drawn, for example. The lane LA on the road R is defined by the two lane markings WL. The state of the vehicle 10 indicated by solid lines is a normal state in which the vehicle 10 is traveling within the lane LA (hereinafter referred to as "within the lane"). The state of the vehicle 10 indicated by long dashed double-short dashed lines is a departed state in which the vehicle 10 is traveling with a part of the vehicle 10 departing from the lane marking WL to the outside. The angle θ shown in FIG. 3 represents an approach angle of the vehicle 10 with respect to the lane marking WL. In the following description, the angle θ is referred to as an approach angle θ.

The structure K is an object provided in the vicinity of the lane marking WL. The structure K is, for example, a guardrail. In the present embodiment, the structure K is provided in the vicinity of only a part of the road R. In other parts of the road R without the structure K, the vehicle 10 can depart from the lane marking WL to the outside (hereinafter referred to as "depart from the lane"). In the following description, the departure of at least a part of the vehicle 10 from the lane LA to the outside will be referred to as a departure of the vehicle 10 from the lane.

Configuration of Main Part

Next, the seat belt control device 30 will be described.

Figure 2:
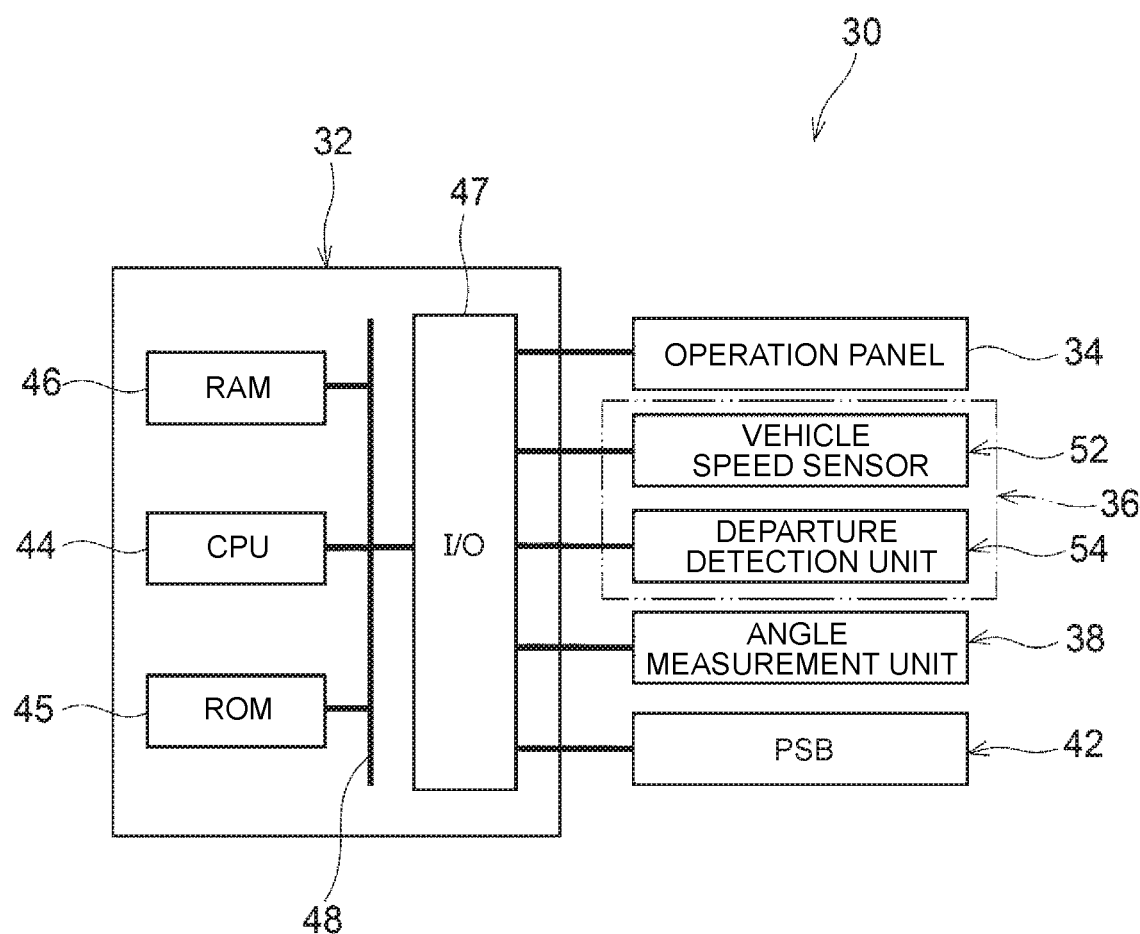
FIG. 2 is a block diagram showing a configuration of the seat belt control device in FIG. 1.

As shown in FIG. 2, the seat belt control device 30 includes the ECU 32, an operation panel 34, a detection unit 36, an angle measurement unit 38, and a pre-crash seat belt mechanism (PSB) 42, for example. Although the designation "PSB" is consistently used in this disclosure, a motorized seat belt mechanism (MSB) may be used as another designation.

Ecu

The ECU 32 is an example of an electronic control unit. The ECU 32 includes a central processing unit (CPU) 44, a read-only memory (ROM) 45, a random access memory (RAM) 46, and an input/output (I/O) interface 47. The ECU 32 is configured as a computer in which the above components are connected to a bus 48. Various parts of the vehicle 10 including the operation panel 34, the detection unit 36, the angle measurement unit 38, and the PSB 42 (see FIG. 1) are electrically connected to the ECU 32. Control of actuation of the PSB 42 performed by the ECU 32 will be described later.

Operation Panel

The operation panel 34 is provided on an instrument panel (not shown) of the vehicle 10 (see FIG. 1), for example. The operation panel 34 includes a touch panel (not shown). On the operation panel 34, operation buttons for starting and stopping operation of various components of the vehicle 10, and setting buttons for making various settings of the seat belt control device 30 are displayed. Operation information (setting information) regarding the operation on the operation panel 34 is output to the ECU 32.

Detection Unit

The detection unit 36 includes a vehicle speed sensor 52 and a departure detection unit 54, for example.

The vehicle speed sensor 52 is provided in a part of the vehicle 10, in which a rotational speed changes in accordance with a traveling speed of the vehicle 10 (hereinafter referred to as a vehicle speed), such as a brake rotor or a transmission (not shown). The vehicle speed sensor 52 measures the vehicle speed of the vehicle 10 based on the change in the rotational speed. Information on the vehicle speed measured by the vehicle speed sensor 52 is output to the ECU 32.

The departure detection unit 54 includes a camera (not shown). Specifically, the departure detection unit 54 detects the lane marking WL (see FIG. 3) based on an image taken by the camera at a predetermined cycle time. Then, the departure detection unit 54 calculates a distance between a side surface of the vehicle 10 and the lane marking WL from a position of the vehicle 10 and a position of the lane marking WL in the image, thereby detecting a departure of the vehicle 10 from the lane marking WL to the outside (departure of the vehicle 10 from the lane).

Information on presence or absence of the departure detected by the departure detection unit 54 is output to the ECU 32. In the present disclosure, detection of a departure of the vehicle 10 from the lane includes detection of a departure of the vehicle 10 from the lane marking WL to the outside as well as detection of a predicted departure of the vehicle 10 from the lane marking WL to the outside.

Angle Measurement Unit

The angle measurement unit 38 measures the approach angle θ of the vehicle 10 departing from the lane (see FIG. 3). Specifically, the angle measurement unit 38 is configured to measure the approach angle θ of the vehicle 10 at the timing that the vehicle 10 departs from the lane marking WL to the outside (see FIG. 3), based on information about the distance and the angle obtained from the image taken by the camera (not shown) of the departure detection unit 54. Information on the approach angle θ measured by the angle measurement unit 38 is output to the ECU 32.

PSB

The PSB 42 shown in FIG. 1 is an example of a retracting unit, and includes a motor 43 disposed on a side of the spool 28. When the motor 43 rotates, the spool 28 is driven in the winding direction of the webbing 22. When the PSB 42 is actuated, the PSB 42 rotates the spool 28 in the winding direction of the webbing 22 so as to apply tension to the webbing 22 (retract the webbing 22). That is, the PSB 42 retracts the webbing 22 with a driving force of the motor 43. Driving of the motor 43 is controlled by the ECU 32.

Setting of ECU

In the ECU 32, a program is set so that the PSB 42 is not operated when the vehicle speed V of the vehicle 10 at the time of departure from the lane (not shown) is equal to or higher than a prescribed speed and the approach angle θ of the vehicle 10 at the time of departure from the lane (see FIG. 3) is smaller than a prescribed angle. Further, in the ECU 32, a program is set so that the PSB 42 is operated when the vehicle speed V of the vehicle 10 at the time of departure from the lane is equal to or higher than the prescribed speed and the approach angle θ of the vehicle 10 at the time of departure from the lane is equal to or larger than the prescribed angle.

Figure 4:
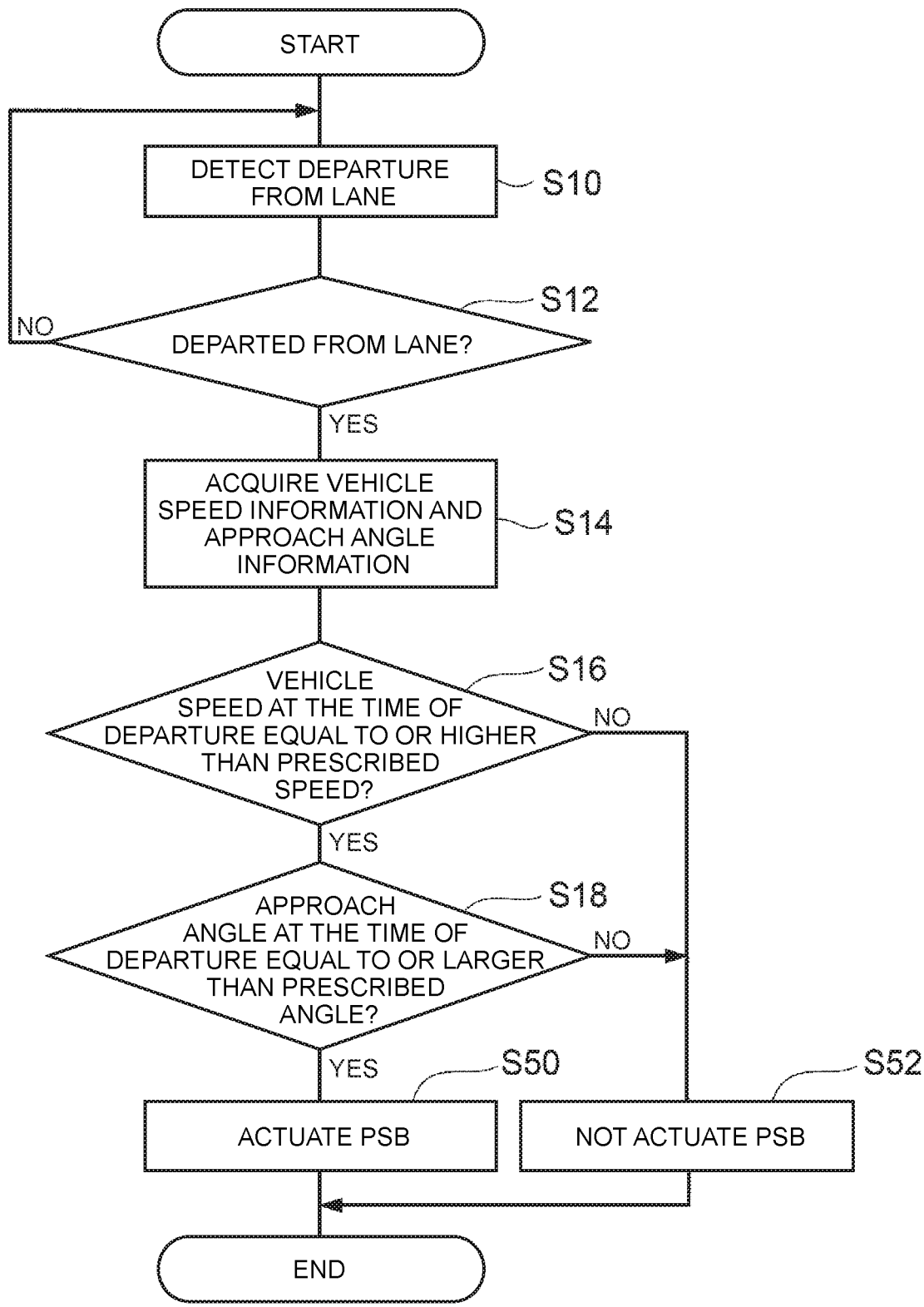
FIG. 4 is a flowchart showing a flow of a process to select actuation or non-actuation of a pre-crash seat belt mechanism (hereinafter referred to as "PSB") in the seat belt control device in FIGS. 1 and 2.

Next, operations and effects of the seat belt control device 30 according to the first embodiment will be described using a flowchart shown in FIG. 4. Note that various components of the vehicle 10 including the seat belt control device 30 will be described with reference to FIGS. 1 to 3, although the figure numbers will not be individually specified.

In step S10, the departure detection unit 54 detects the departure of the vehicle 10 (host vehicle) from the lane. The detection information (departure information) is output to the ECU 32. Then, the process proceeds to step S12.

In step S12, the ECU 32 determines the departure of the vehicle 10 from the lane based on the departure information. When the vehicle 10 has not departed from the lane, the process proceeds to step S10. When the vehicle 10 has departed from the lane, the process proceeds to step S14.

In step S14, the ECU 32 acquires the vehicle speed information from the vehicle speed sensor 52, and acquires approach angle information from the angle measurement unit 38. Then, the process proceeds to step S16.

In step S16, the ECU 32 determines, based on the vehicle speed information, whether the vehicle speed V of the vehicle 10 at the time of departure from the lane is equal to or higher than the prescribed speed. When the vehicle speed V at the time of departure is equal to or higher than the prescribed speed, the process proceeds to step S18. When the vehicle speed V at the time of departure is lower than the prescribed speed, the process proceeds to step S52.

In step S18, the ECU 32 determines, based on the approach angle information whether the approach angle θ of the vehicle 10 at the time of departure from the lane is equal to or larger than the prescribed angle. When the approach angle θ at the time of departure is equal to or larger than the prescribed angle, the process proceeds to step S50. When the approach angle θ at the time of departure is smaller than the prescribed angle, the process proceeds to step S52.

In step S50, the ECU 32 outputs an actuation signal to the PSB 42. The PSB 42 is actuated by the actuation signal to retract the webbing 22. As a result, a restraining force applied to the occupant D is increased compared to that before the actuation of the PSB 42. Then, the process routine ends.

In step S52, the ECU 32 does not output the actuation signal to the PSB 42. That is, the PSB 42 is maintained in a non-actuated state. Thus, the restraining force applied to the occupant D does not change compared to that before the actuation of the PSB 42. Then, the process routine ends.

As described above, in the seat belt control device 30, when the departure detection unit 54 detects the departure of the vehicle 10 from the lane and the vehicle speed V measured by the vehicle speed sensor 52 is equal to or higher than the prescribed speed, the ECU 32 operates the PSB 42. When the departure detection unit 54 detects the departure of the vehicle 10 from the lane and the vehicle speed V measured by the vehicle speed sensor 52 is lower than the prescribed speed, the ECU 32 does not operate the PSB 42. Thus, when it is not necessary to restrain the occupant D in the vehicle 10 with the webbing 22, the PSB 42 is not operated. As a result, in the configuration in which the webbing 22 is retracted based on the detection result of the departure of the vehicle 10 from the lane, it is possible to suppress discomfort to the occupant D caused by restraint.

Further, in the seat belt control device 30, the ECU 32 operates the PSB 42 when the vehicle speed V of the vehicle 10 at the time of departure from the lane is equal to or higher than the prescribed speed and the approach angle θ of the vehicle 10 at the time of departure from the lane is equal to or larger than the prescribed angle. When the vehicle speed V of the vehicle 10 at the time of departure from the lane is equal to or higher than the prescribed speed and the approach angle θ of the vehicle 10 at the time of departure from the lane is smaller than the prescribed angle, the ECU 32 does not operate the PSB 42. Thus, when it is not necessary to restrain the occupant D in the vehicle 10 with the webbing 22 (e.g., when the vehicle 10 has departed from the lane but is traveling along the lane marking WL), the PSB 42 is less likely to be operated. This can further suppress discomfort to the occupant D caused by restraint.

Second Embodiment

Next, a seat belt control device 60 will be described as an example of a control device for a seat belt of a vehicle according to a second embodiment. The seat belt control device 60 is provided in place of the seat belt control device 30 in the vehicle 10. Components that are basically the same as those of the seat belt control devices 30 are denoted by the same reference characters and the description thereof will be omitted.

Figure 5:
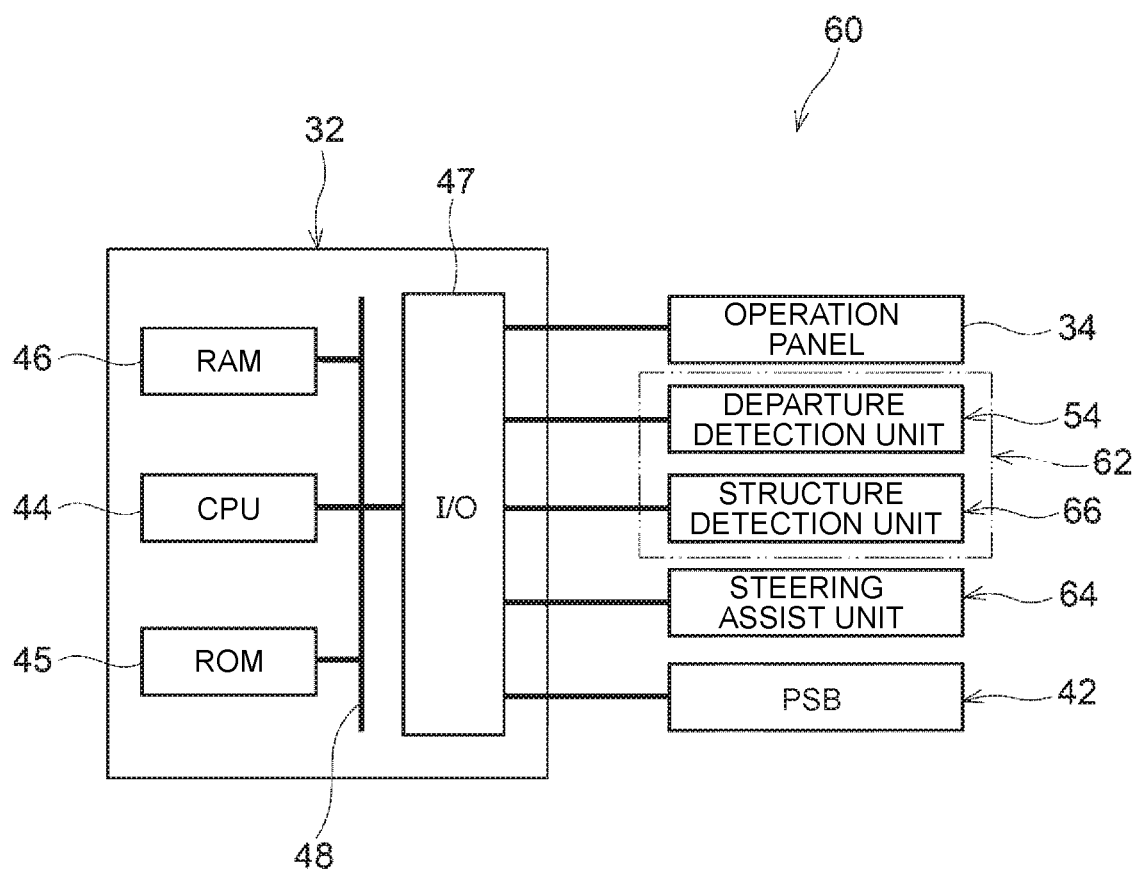
FIG. 5 is a block diagram showing a configuration of a seat belt control device according to a second embodiment.

As shown in FIG. 5, the seat belt control device 60 includes the ECU 32, the operation panel 34, a detection unit 62, a steering assist unit 64, and the PSB 42, for example.

Detection Unit

The detection unit 62 includes the departure detection unit 54 and a structure detection unit 66, for example.

Structure Detection Unit

The structure detection unit 66 includes a millimeter-wave radar device (not shown). Specifically, the structure detection unit 66 outputs a transmission wave (electromagnetic wave) ahead of the vehicle 10, and receives a reflection wave reflected by the structure K outside the lane (see FIG. 3). That is, the structure detection unit 66 detects presence or absence of the structure K outside the lane based on presence or absence of the reflection wave. When the structure K is present, the structure detection unit 66 detects a distance between the vehicle 10 and the structure K, based on time from when the structure detection unit 66 transmits the transmission wave to when the structure detection unit 66 receives the reflection wave. The detection information of the structure K obtained by the structure detection unit 66 is output to the ECU 32. The structure detection unit 66 can also be used as a collision prediction unit that predicts a collision between the vehicle 10 and the structure K.

Steering Assist Unit

The steering assist unit 64 detects the lane marking WL (see FIG. 3) based on the image taken by the camera (not shown) of the departure detection unit 54, for example. Then, the steering assist unit 64 obtains the steering torque of the steering wheel 14 (see FIG. 1) such that the center of the vehicle 10 in the vehicle width direction is located substantially at the midpoint between the right and left lane markings WL. Information on the steering torque obtained by the steering assist unit 64 is output to the ECU 32. That is, the steering assist unit 64 assists in steering of the vehicle 10 so that the vehicle 10 is held within the lane.

Setting of ECU

In the ECU 32, a program is set so that the PSB 42 is not operated when the departure detection unit 54 detects the departure of the vehicle 10 from the lane and the structure detection unit 66 does not detect the structure K. Further, in the ECU 32, a program is set so that the PSB 42 is operated when the departure detection unit 54 detects a departure of the vehicle 10 from the lane and the structure detection unit 66 detects the structure K.

Furthermore, in the ECU 32, a program is set for controlling the steering torque of the steering wheel 14 to the steering torque obtained by the steering assist unit 64. In the ECU 32, a program is set so that the PSB 42 is not operated when the departure of the vehicle 10 from the lane is detected, the structure K is detected, and the vehicle 10 can be returned to the lane with the steering assist by the steering assist unit 64.

The ECU 32 determines a movable distance of the vehicle 10 toward the lane based on the steering torque obtained by the steering assist unit 64. Furthermore, the ECU 32 determines whether the vehicle 10 can return to the lane LA (to the lane) based on the distance between the vehicle 10 and the lane marking WL obtained by the departure detection unit 54 and the movable distance of the vehicle 10 toward the lane. In the ECU 32, a program is set so that the PSB 42 is operated when the steering assist unit 64 can not return the vehicle 10 to the lane.

Figure 6:
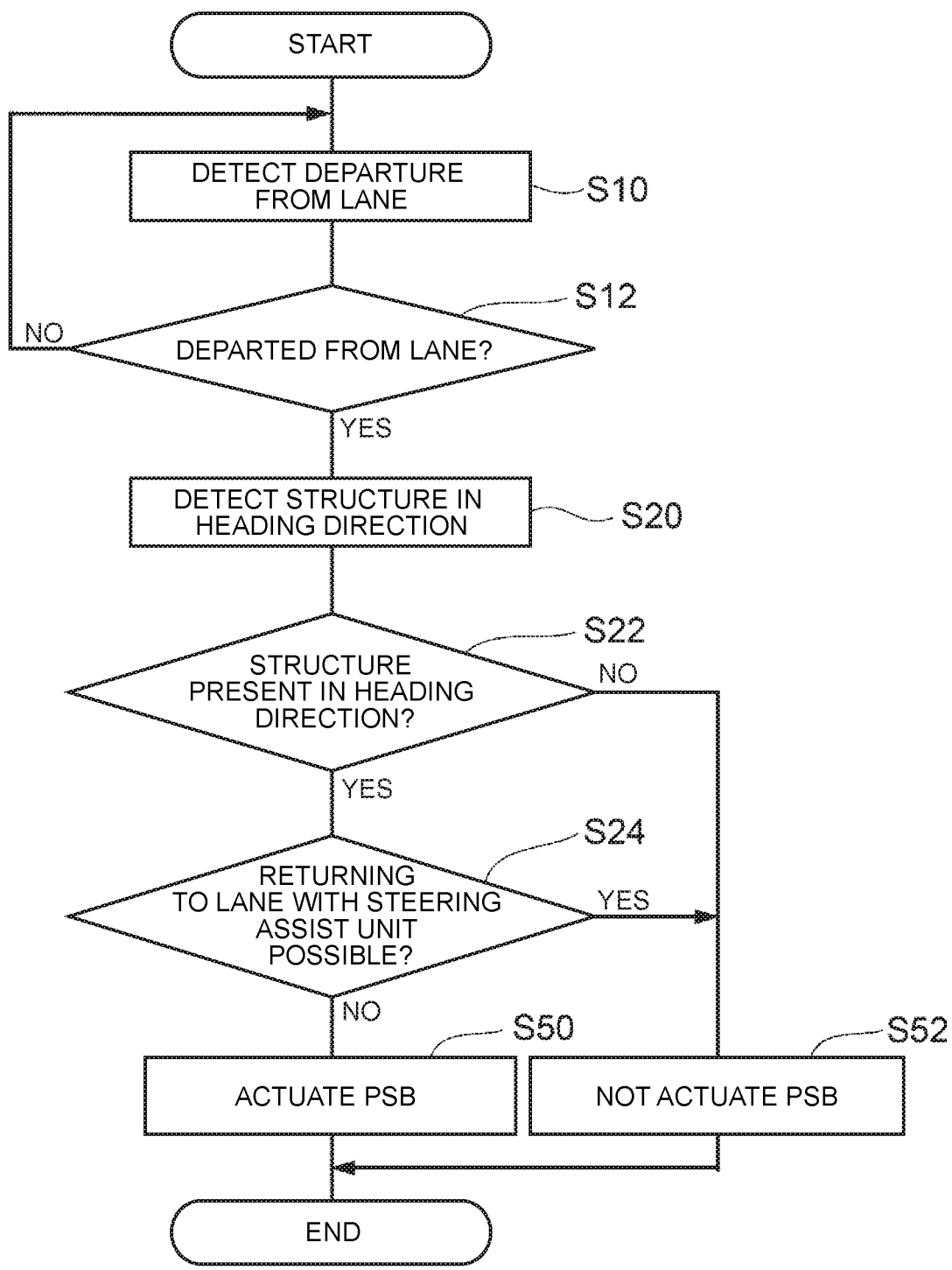
FIG. 6 is a flowchart showing a flow of a process to select actuation or non-actuation of the PSB in the seat belt control device in FIG. 5.

Next, operations and effects of the seat belt control device 60 according to the second embodiment will be described using a flowchart shown in FIG. 6. Note that various components of the vehicle 10 including the seat belt control device 60 will be described with reference to FIGS. 1, 3, and 5, although the figure numbers will not be individually specified. The same steps as those of the flowchart in FIG. 4 are denoted by the same step numbers and description thereof will be omitted.

Steps S10 and S12 are performed, and the process proceeds to step S20. That is, the vehicle 10 has departed from the lane.

In step S20, the structure detection unit 66 detects presence or absence of the structure K outside the lane. The detection information (information on the structure K) is output to the ECU 32. Then, the process proceeds to step S22.

In step S22, the ECU 32 determines presence or absence of the structure K outside the lane based on the information on the structure K. When the structure K is present outside the lane, the process proceeds to step S24. When the structure K is not present outside the lane, the process proceeds to step S52.

In step S24, the ECU 32 obtains the movable distance of the vehicle 10 toward the lane LA based on the information on the steering torque obtained by the steering assist unit 64. Then, the ECU 32 determines whether the vehicle 10 can return to the lane based on the distance between the vehicle 10 and the lane marking WL obtained by the departure detection unit 54 and the movable distance of the vehicle 10 toward the lane. When the ECU 32 determines that the vehicle 10 can not return to the lane LA, the process proceeds to step S50. When the ECU 32 determines that the vehicle 10 can return to the lane LA, the process proceeds to step S52.

In step S50, the PSB 42 is actuated. In step S52, the PSB 42 is not actuated. Then, the process routine ends.

As described above, in the seat belt control device 60, when the departure detection unit 54 detects the departure of the vehicle 10 from the lane and the structure detection unit 66 detects the structure K, the ECU 32 operates the PSB 42. When the departure detection unit 54 detects the departure of the vehicle 10 from the lane and the structure detection unit 66 does not detect the structure K, the ECU 32 does not operate the PSB 42. Thus, when it is not necessary to restrain the occupant D in the vehicle 10 with the webbing 22, the PSB 42 is not operated. Thus, in the configuration in which the webbing 22 is retracted based on the detection result of the lane departure, it is possible to suppress discomfort to the occupant D caused by restraint.

Further, when the departure of the vehicle 10 from the lane is detected and the structure detection unit 66 detects the structure K, the vehicle 10 may return to the lane (the departure may be eliminated) with the steering assist by the steering assist unit 64 in the seat belt control device 60. When the vehicle 10 returns to the lane, there is no need to operate the PSB 42. That is, when it is not necessary to restrain the occupant D in the vehicle 10 with the webbing 22, the PSB 42 is less likely to be operated and thus it is possible to further suppress discomfort to the occupant D caused by restraint.

Third Embodiment

Next, a seat belt control device 70 will be described as an example of a control device for a seat belt of a vehicle according to a third embodiment. The seat belt control device 70 is provided in place of the seat belt control device 30 in the vehicle 10. Components that are basically the same as those of the seat belt control devices 30 and 60 are denoted by the same reference characters and the description thereof will be omitted.

Figure 7:
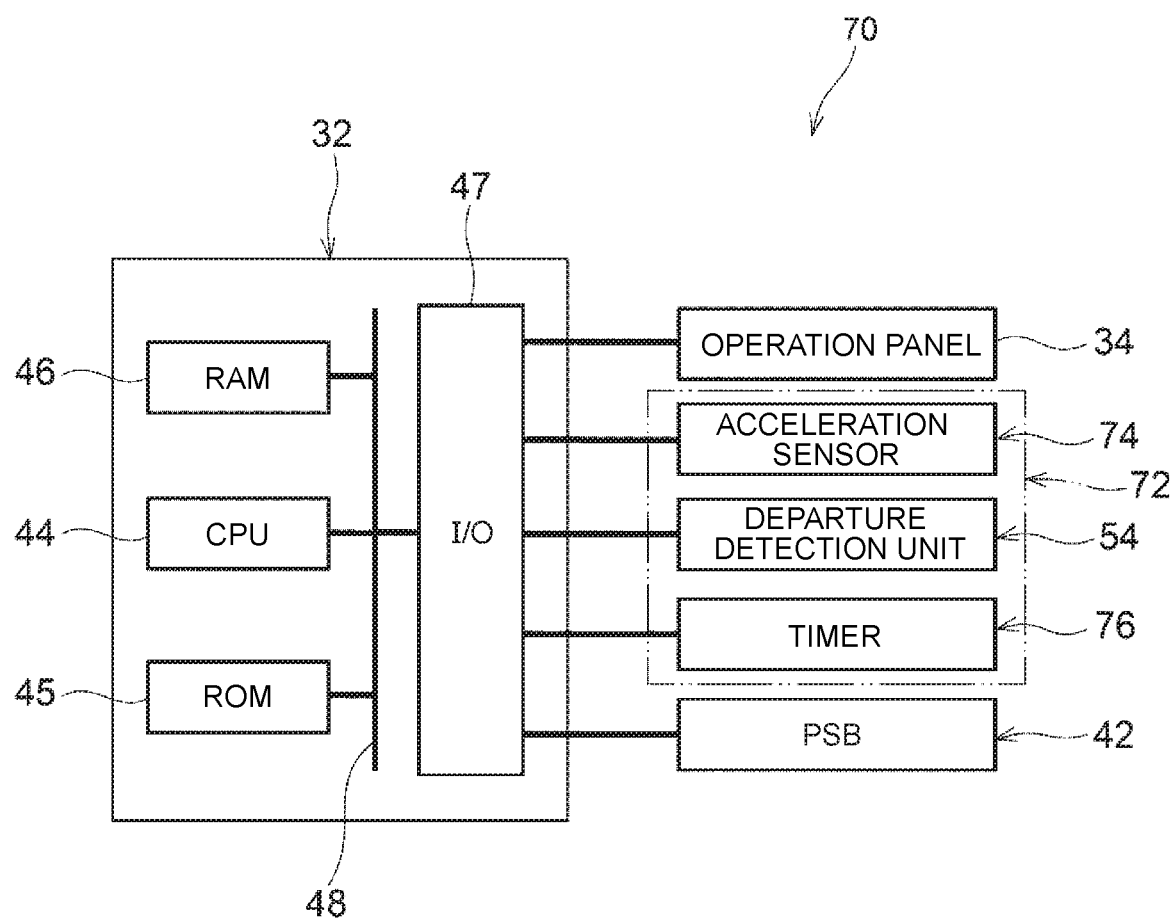
FIG. 7 is a block diagram showing a configuration of a seat belt control device according to a third embodiment.

As shown in FIG. 7, the seat belt control device 70 has the ECU 32, the operation panel 34, a detection unit 72, and the PSB 42, for example.

Detection Unit

The detection unit 72 includes the departure detection unit 54, an acceleration sensor 74, and a timer 76, for example.

Acceleration Sensor

The acceleration sensor 74 is configured to measure an acceleration generated in the vehicle 10 (at least one of an acceleration in a vehicle longitudinal direction and an acceleration in the vehicle width direction). Information on the acceleration measured by the acceleration sensor 74 (hereinafter, referred to as an acceleration G) is output to the ECU 32.

Timer

The timer 76 measures various elapsed times associated with the vehicle 10. Actuation and deactuation of the timer 76 is instructed by the ECU 32. The time information measured by the timer 76 is output to the ECU 32.

Setting of ECU

In the ECU 32, a program is set so that the PSB 42 is not operated when the departure detection unit 54 detects the departure of the vehicle 10 from the lane and the acceleration G measured by the acceleration sensor 74 is smaller than a prescribed acceleration (hereinafter referred to as prescribed acceleration). The acceleration G measured by the acceleration sensor 74 represents an average of the acceleration G within a set period of time measured by the timer 76 after the departure of the vehicle 10. Further, in the ECU 32, a program is set so that the PSB 42 is operated when the departure detection unit 54 detects the departure of the vehicle 10 from the lane and the acceleration G measured by the acceleration sensor 74 is equal to or larger than the prescribed acceleration.

Figure 8:
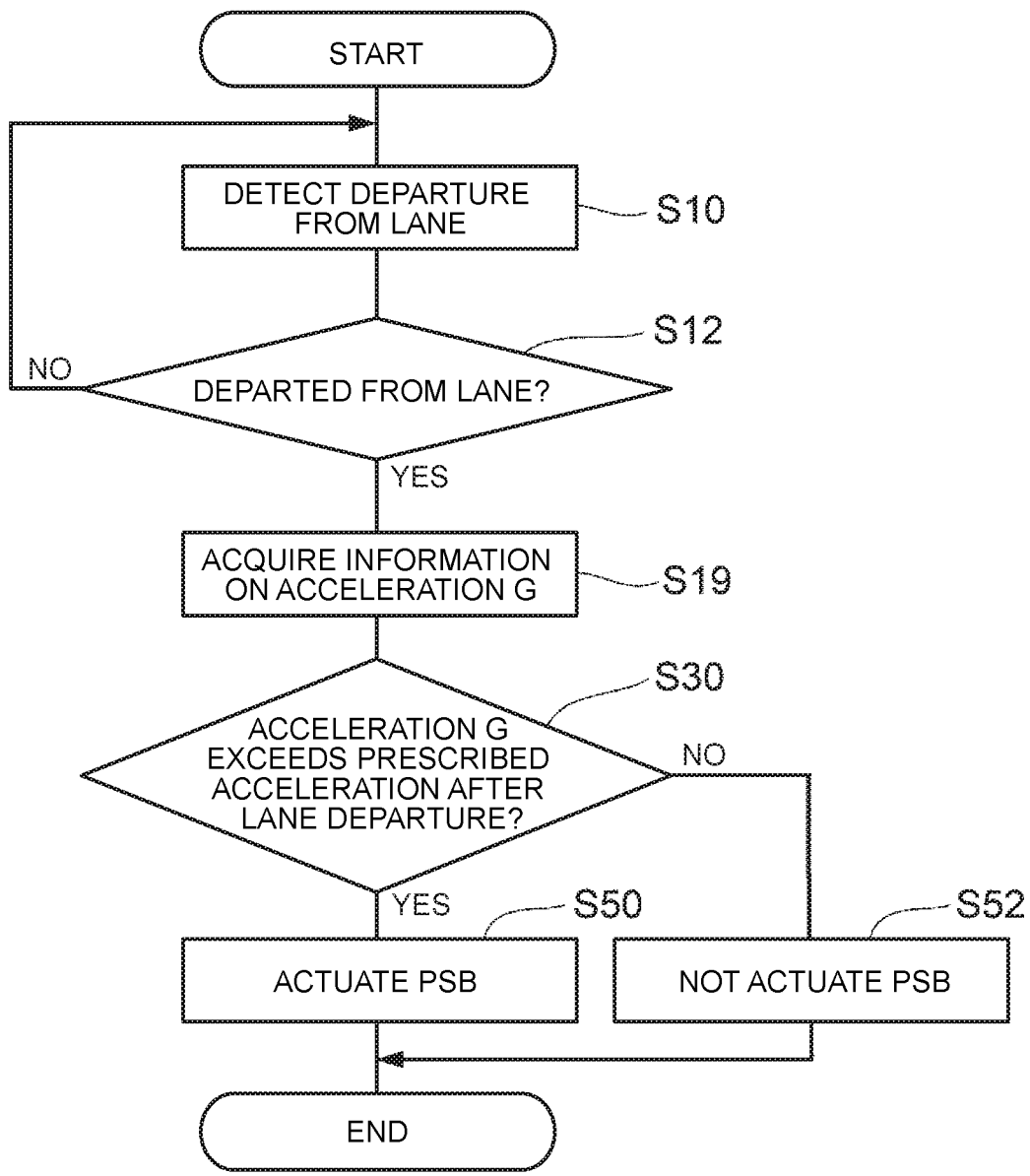
FIG. 8 is a flowchart showing a flow of a process to select actuation or non-actuation of the PSB in the seat belt control device in FIG. 7.

Next, operations and effects of the seat belt control device 70 according to the third embodiment will be described using a flowchart shown in FIG. 8. Note that various components of the vehicle 10 including the seat belt control device 70 will be described with reference to FIGS. 1, 3, and 7, although the figure numbers will not be individually specified. The same steps as those of the flowcharts in FIGS. 4 and 6 are denoted by the same step numbers and description thereof will be omitted.

Steps S10 and S12 are performed, and the process proceeds to step S19. That is, the vehicle 10 has departed from the lane.

In step S19, the ECU 32 acquires information on the acceleration G measured by the acceleration sensor 74. Then, the process proceeds to step S30.

In step S30, the ECU 32 determines whether the acceleration G of the vehicle 10 exceeds the prescribed acceleration after the lane departure. When the acceleration G of the vehicle 10 exceeds the prescribed acceleration, the process proceeds to step S50. When the acceleration G of the vehicle 10 does not exceed the prescribed acceleration, the process proceeds to step S52.

In step S50, the PSB 42 is actuated. In step S52, the PSB 42 is not actuated. Then, the process routine ends.

As described above, in the seat belt control device 70, when the departure detection unit 54 detects the departure of the vehicle 10 from the lane and the acceleration G measured by the acceleration sensor 74 is equal to or larger than the prescribed acceleration, the ECU 32 operates the PSB 42. When the departure detection unit 54 detects the departure of the vehicle 10 from the lane and the acceleration G measured by the acceleration sensor 74 is smaller than the prescribed acceleration, the ECU 32 does not operate the PSB 42. Thus, when it is not necessary to restrain the occupant D in the vehicle 10 with the webbing 22, the PSB 42 is not operated. Accordingly, in the configuration in which the webbing 22 is retracted based on the detection result of the lane departure, it is possible to suppress discomfort to the occupant D caused by restraint.

Fourth Embodiment

Next, a seat belt control device 80 will be described as an example of a control device for a seat belt of a vehicle according to a fourth embodiment. The seat belt control device 80 is provided in place of the seat belt control device 30 in the vehicle 10. Components that are basically the same as those of the seat belt control devices 30, 60, and 70 are denoted by the same reference characters and the description thereof will be omitted.

Figure 9:
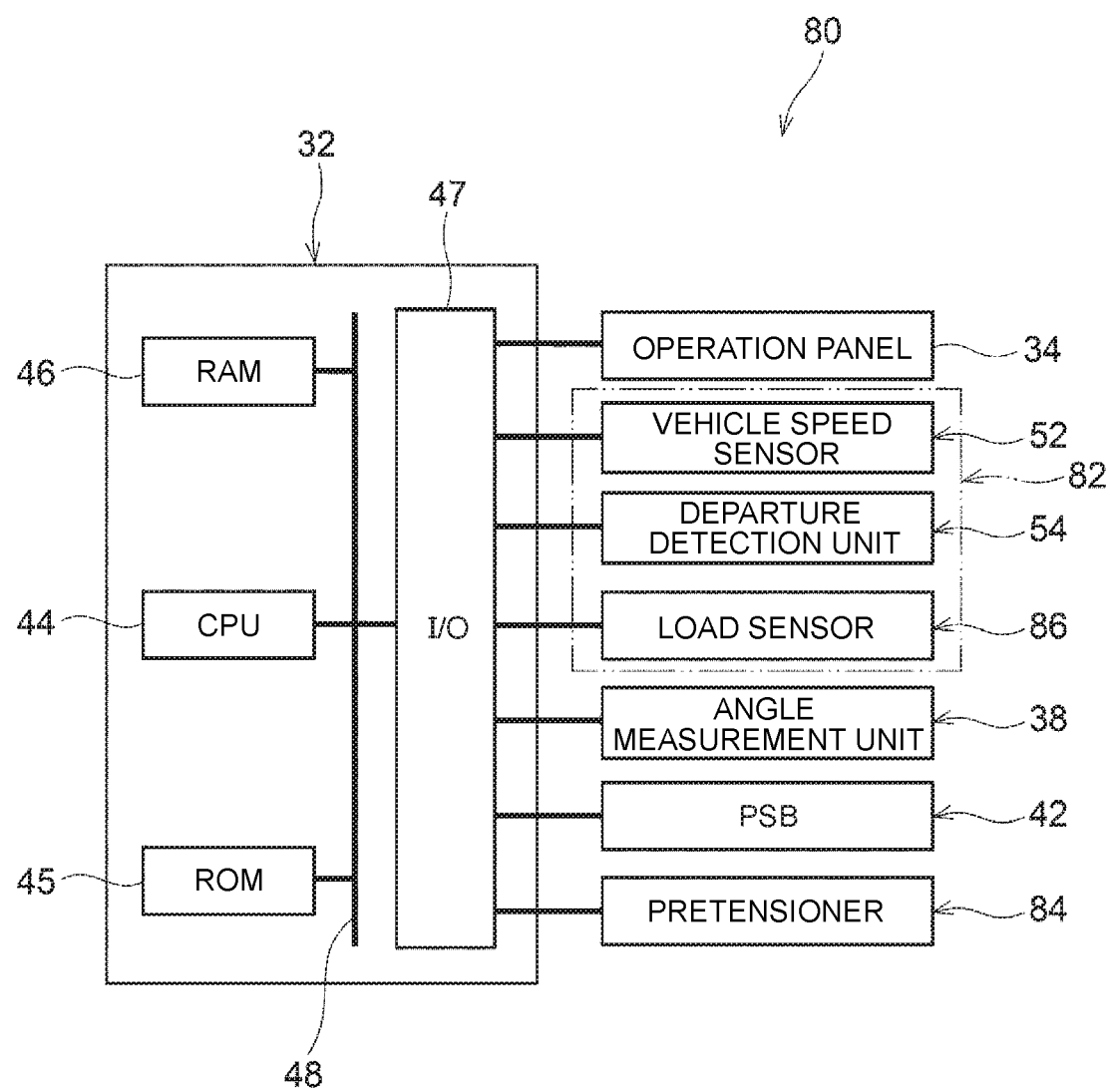
FIG. 9 is a block diagram showing a configuration of a seat belt control device according to a fourth embodiment.

As shown in FIG. 9, the seat belt control device 80 includes the ECU 32, the operation panel 34, a detection unit 82, the angle measurement unit 38, the PSB 42, and a pretensioner 84, for example. In other words, the seat belt control device 80 is a control device obtained by adding a load sensor 86 and the pretensioner 84 described later to the seat belt control device 30 (see FIG. 2).

Detection Unit

The detection unit 82 includes the vehicle speed sensor 52, the departure detection unit 54, and the load sensor 86, for example.

The load sensor 86 includes a pressure sensor provided at a front end of the vehicle 10. The load sensor 86 measures a load input to the vehicle 10. Information on the load measured by the load sensor 86 is output to the ECU 32.

Pretensioner

The pretensioner 84 has an igniter (not shown), for example. When the igniter is actuated by an actuation signal from the ECU 32, the spool 28 (see FIG. 1) is driven in the winding direction instantaneously (earlier than the PSB 42). Driving of the pretensioner 84 is controlled by the ECU 32 based on the load measured by the load sensor 86 and a prescribed load S described later. That is, when the load input to the vehicle 10 exceeds the prescribed load S, the pretensioner 84 retracts the webbing 22 (see FIG. 1) earlier than the PSB 42 does. The pretensioner 84 is not limited to one having an igniter as a drive source, and may drive the spool 28 in the winding direction with a gas generating agent, for example.

Setting of ECU

The same program as that of the first embodiment is set in the ECU 32 for actuation control of the PSB 42. Further, in the ECU 32, the prescribed load S (see FIG. 10) for determining whether to actuate the pretensioner 84 is defined. The prescribed load S includes a prescribed load S2 serving as an initial value and a prescribed load S1 serving as a correction value that is smaller than the prescribed load S2. In the ECU 32, a program is set so that the prescribed load S is changed from S2 to S1 when the departure detection unit 54 detects the departure of the vehicle 10 from the lane. In other words, the ECU 32 sets the prescribed load S smaller than the prescribed load S2 when the departure detection unit 54 detects the departure of the vehicle 10 from the lane.

Figure 10:
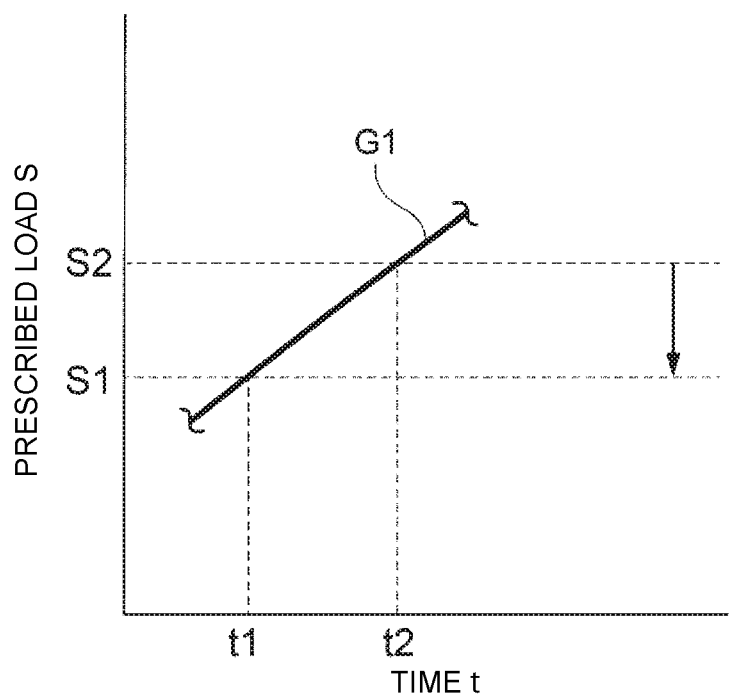
FIG. 10 is a graph showing a change of a load threshold in the seat belt control device in FIG. 9.

In FIG. 10, a graph G1 shows a part of the change in the load measured by the load sensor 86 (see FIG. 9). In the graph G1, the prescribed load S is S1 at time t1 and S2 at time t2 (>t1). Here, when the load measured by the load sensor 86 increases and reaches the prescribed load S, the pretensioner 84 (see FIG. 9) is actuated. That is, when the prescribed load S is changed from S2 to S1, a point in time of actuation of the pretensioner 84 advances from time t2 to time t1.

Figure 11:
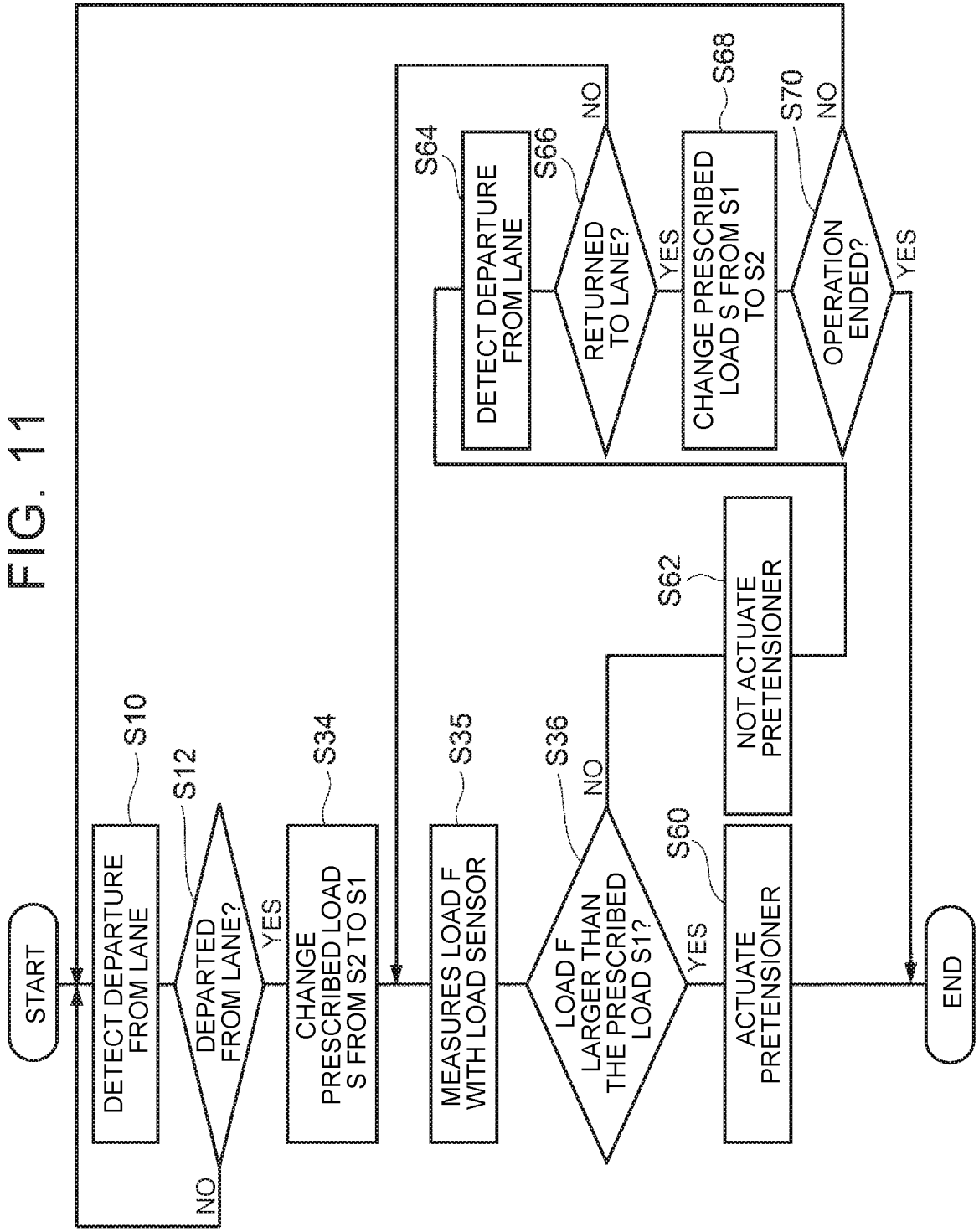
FIG. 11 is a flowchart showing a flow of a process to select actuation or non-actuation of the pretensioner in the seat belt control device in FIG. 9.

Next, operations and effects of the seat belt control device 80 according to the fourth embodiment will be described using a flowchart shown in FIG. 11. Note that various components of the vehicle 10 including the seat belt control device 80 will be described with reference to FIGS. 1, 3, 7, and 9, although the figure numbers will not be individually specified. The same steps as those of the flowcharts in FIGS. 4, 6, and 8 are denoted by the same step numbers and description thereof will be omitted.

Steps S10 and S12 are performed, and the process proceeds to step S34. That is, the vehicle 10 has departed from the lane.

In step S34, the ECU 32 changes the prescribed load S from S2 to S1. Then, the process proceeds to step S35.

In step S35, the load sensor 86 measures a load F (not shown). Information on the measured load F is output to the ECU 32. Then, the process proceeds to step S36.

In step S36, the ECU 32 determines whether the load F is larger than the prescribed load S1 or equal to or smaller than the prescribed load S1. When the load F is larger than the prescribed load S1, the process proceeds to step S60. When the load F is equal to or smaller than the prescribed load S1, the process proceeds to step S62.

In step S60, the ECU 32 outputs an actuation signal to the pretensioner 84. The pretensioner 84 is actuated by the actuation signal to retract the webbing 22 earlier than the PSB 42 does. As a result, the restraining force applied to the occupant D is increased compared to that before the actuation of the pretensioner 84. Then, the process routine ends.

In step S62, the ECU 32 does not output an actuation signal to the pretensioner 84. That is, the pretensioner 84 is maintained in an non-actuated state. Thus, the restraining force applied to the occupant D does not change compared to that before the actuation of the pretensioner 84. Then, the process proceeds to step S64.

In step S64, the departure detection unit 54 detects the departure of the vehicle 10 from the lane. Then, the process proceeds to step S66.

In step S66, the ECU 32 determines whether the vehicle 10 has returned to the lane based on the detection result of the departure detection unit 54. When the vehicle 10 has returned to the lane, the process proceeds to step S68. When the vehicle 10 remains outside the lane, the process proceeds to step S35.

In step S68, the ECU 32 changes the prescribed load S from S1 to S2 (returns the prescribed load S to the initial value). Then, the process proceeds to step S70.

In step S70, the ECU 32 determines an end of driving based on whether an engine (not shown) of the vehicle 10 is in operation. When the engine is not in operation, the process routine ends. When the engine is in operation, the process proceeds to step S10.

As described above, in the seat belt control device 80, when the departure detection unit 54 detects the departure of the vehicle 10 from the lane, the ECU 32 lowers the prescribed load S. Specifically, the ECU 32 changes the prescribed load S from S2 to S1. Then, when the load F measured by the load sensor 86 exceeds the prescribed load S1, the pretensioner 84 retracts the webbing 22 earlier than the PSB 42 does. Here, the prescribed load S is set to a smaller value (prescribed load S1). Therefore, the pretensioner 84 can retract the webbing 22 at an early stage of a collision, compared with the case where the prescribed load S is maintained at the initial value (prescribed load S2). Thus, restraint performance for the occupant D can be improved.

MODIFICATIONS

The disclosure is not limited to the above embodiments. In each modification described below, components that are the same as those of the seat belt control device 30, 60, 70, and 80 are denoted by the same reference characters and the description thereof will be omitted.

First Modification

Figure 12:
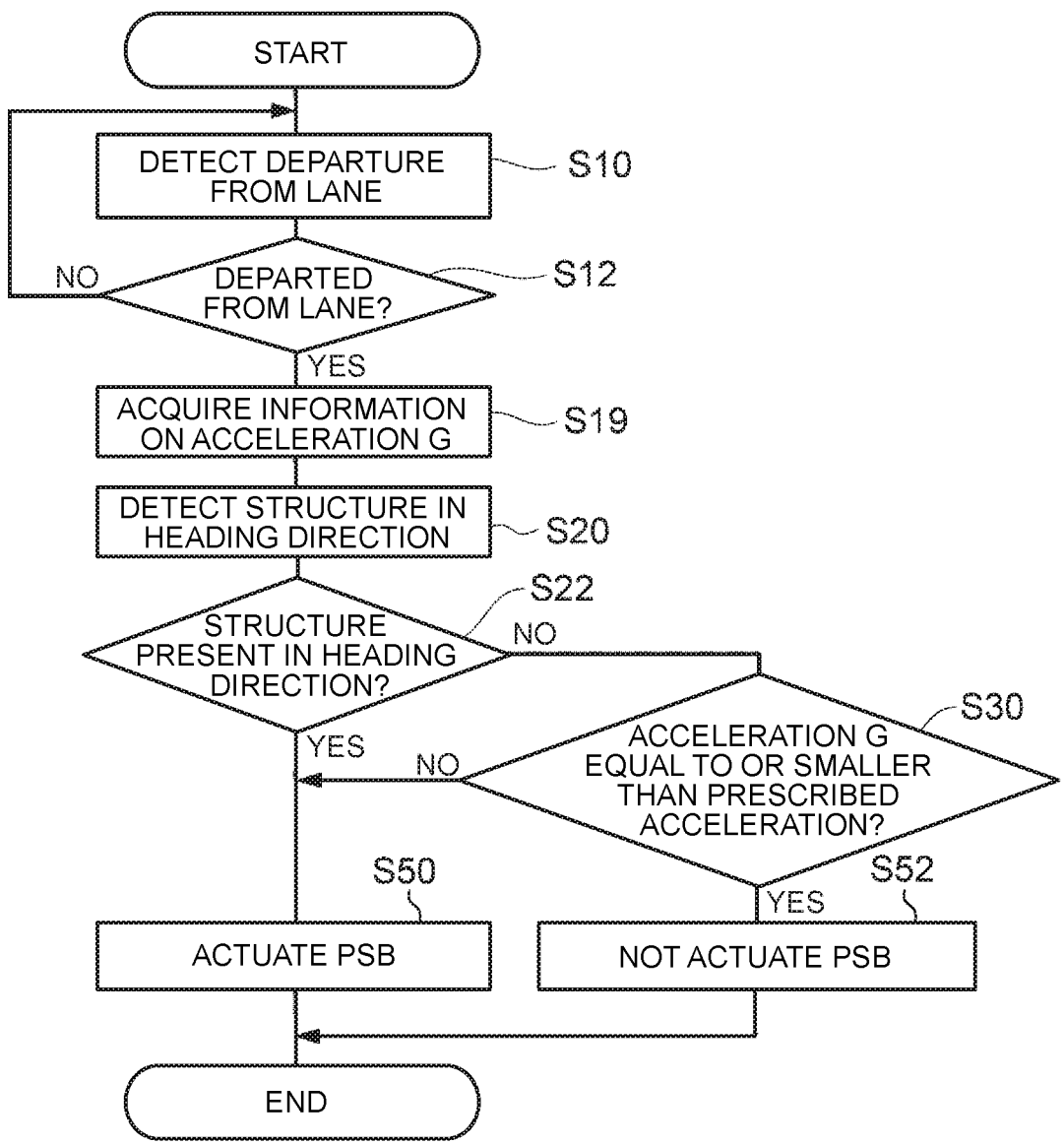
FIG. 12 is a flowchart showing a flow of a process to select actuation or non-actuation of the PSB in a seat belt control device according to a first modification.

As shown in FIG. 12, a process routine may be used to determine whether to actuate the PSB 42 by combining the presence or absence of the structure K and the acceleration G.

Steps S10 and S12 are performed, and the process proceeds to step S19. That is, the vehicle 10 has departed from the lane. In step S19, the ECU 32 acquires information on the acceleration G. Then, the process proceeds to step S20. In step S20, the structure detection unit 66 detects presence or absence of the structure K outside the lane. Then, the process proceeds to step S22. In step S22, the ECU 32 determines presence or absence of the structure K outside the lane. When the structure K is present outside the lane, the process proceeds to step S50. When the structure K is not present outside the lane, the process proceeds to step S30.

In step S30, the ECU 32 determines whether the acceleration G of the vehicle 10 exceeds the prescribed acceleration after the lane departure. When the acceleration G of the vehicle 10 exceeds the prescribed acceleration, the process proceeds to step S50. When the acceleration G of the vehicle 10 does not exceed the prescribed acceleration, the process proceeds to step S52. In step S50, the PSB 42 is actuated. In step S52, the PSB 42 is not actuated. Then, the process routine ends. As described above, when the structure K is not present and the acceleration G exceeds the prescribed acceleration, the ECU 32 actuates the PSB 42 so that the restraint performance for the occupant D can be improved.

Second Modification

Figure 13:
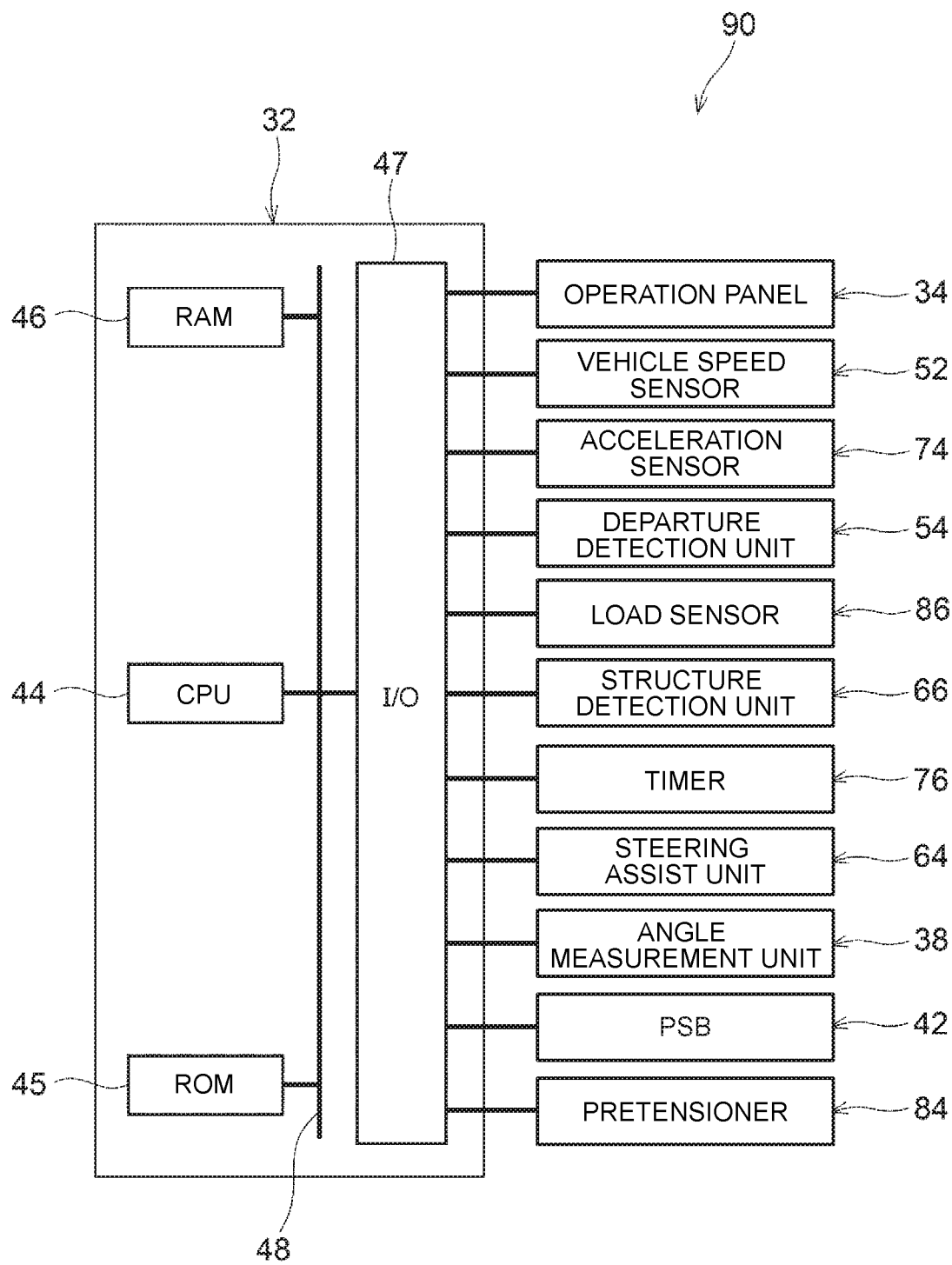
FIG. 13 is a block diagram showing a configuration of a seat belt control device according to a second modification.

A seat belt control device 90 shown in FIG. 13 may be used. The seat belt control device 90 includes all the components of the seat belt control devices 30, 60, 70, and 80 (see FIGS. 2, 5, 7, and 9). In the seat belt control device 90, the operation panel 34 may be used to select which factors are used as triggers to determine whether to actuate the PSB 42 and whether to actuate the pretensioner 84.

OTHER MODIFICATIONS

In the seat belt control device 30, the approach angle θ need not be used as a determination parameter. That is, in the ECU 32, a program may be set so that the PSB 42 is not operated when the departure of the vehicle 10 from the lane is detected and the vehicle speed V is lower than the prescribed speed. In addition, in the ECU 32, a program may be set so that the PSB 42 is operated when the departure of the vehicle 10 from the lane is detected and the vehicle speed V is equal to or higher than the prescribed speed.

In the seat belt control device 60, whether to actuate the PSB 42 may be determined based on only the detection result of the structure K by the structure detection unit 66 without using the steering assist unit 64. In addition, by combining the components of the seat belt control device 60 with the components of the seat belt control device 80 (by removing unnecessary components from the seat belt control device 90), the change of the prescribed load S and the determination whether to actuate the pretensioner 84 may be performed.

By combining the components of the seat belt control device 70 with the components of the seat belt control device 80 (by removing unnecessary components from the seat belt control device 90), the change of the prescribed load S and the determination whether to actuate the pretensioner 84 may be performed.

The ECU 32 may include more than one ECUs, and may be configured as an assembly of ECUs provided corresponding to various controls.

The disclosure is not limited to the above embodiments and modifications, and may be modified in various ways without departing from the scope of the disclosure.

What is claimed is:

1. A control device for a seat belt of a vehicle, the control device comprising:
   a seat belt mechanism configured to retract the seat belt with a driving force of a motor;
   a camera configured to detect a departure of the vehicle from a lane;
   a vehicle speed sensor configured to measure a vehicle speed of the vehicle; and
   an electronic control unit configured not to operate the seat belt mechanism in response to determining a first condition is satisfied and a second condition is not satisfied,
   the first condition being a condition that the camera detects the departure of the vehicle from the lane, and the second condition being a condition that the vehicle speed measured by the vehicle speed sensor is equal to or higher than a prescribed speed; and
   an angle measurement unit configured to measure an approach angle of the vehicle toward an outside of the lane at a time of the departure of the vehicle from the lane, wherein:
      the electronic control unit is configured to operate the seat belt mechanism in response to determining all of the first condition, the second condition and a third condition are satisfied, the third condition being a condition that the approach angle measured by the angle measurement unit is equal to or larger than a prescribed angle; and
      the electronic control unit is configured not to operate the seat belt mechanism in response to determining both the first condition and the second condition are satisfied and the third condition is not satisfied.

2. A control device for a seat belt of a vehicle, the control device comprising:
   a seat belt mechanism configured to retract the seat belt with a driving force of a motor;
   a camera configured to detect a departure of the vehicle from a lane;
   a radar device configured to detect presence or absence of a structure outside the lane; and
   an electronic control unit configured not to operate the seat belt mechanism in response to determining a first condition is satisfied and a second condition is not satisfied,
   the first condition being a condition that the camera detects the departure of the vehicle from the lane, and the second condition being a condition that the structure radar device detects the structure, wherein:
      the electronic control unit is configured not to operate the seat belt mechanism in response to determining all of the first condition, the second condition and a third condition are satisfied; and
      the third condition is a condition in which the electronic control unit determines that the vehicle is allowed to return to a lane.

3. A control device for a seat belt of a vehicle, the control device comprising:
   a seat belt mechanism configured to retract the seat belt with a driving force of a motor;
   a camera configured to detect a departure of the vehicle from a lane;
   an acceleration sensor configured to measure an acceleration of the vehicle; and
   an electronic control unit configured to operate the seat belt mechanism in response to determining both a first condition and a second condition are satisfied,
   the first condition being a condition that the camera detects the departure of the vehicle from the lane, and the second condition being a condition that the acceleration measured by the acceleration sensor is equal to or larger than a prescribed acceleration; and
   the electronic control unit being configured not to operate the seat belt mechanism in response to determining the first condition is satisfied and the second condition is not satisfied.

4. The control device according to claim 1, further comprising:
   a load sensor configured to measure a load input to the vehicle; and
   a pretensioner that retracts the seat belt earlier than the seat belt mechanism does when the load measured by the load sensor exceeds a prescribed load, wherein the electronic control unit is configured to lower the prescribed load in response to the camera detecting the departure of the vehicle from the lane.

5. The control device according to claim 2, further comprising:
   a load sensor configured to measure a load input to the vehicle; and
   a pretensioner that retracts the seat belt earlier than the seat belt mechanism does when the load measured by the load sensor exceeds a prescribed load, wherein the electronic control unit is configured to lower the prescribed load in response to the camera detecting the departure of the vehicle from the lane.

6. The control device according to claim 3, further comprising:
   a load sensor configured to measure a load input to the vehicle; and
   a pretensioner that retracts the seat belt earlier than the seat belt mechanism does when the load measured by the load sensor exceeds a prescribed load, wherein the electronic control unit is configured to lower the prescribed load in response to the camera detecting the departure of the vehicle from the lane.

7. The control device according to claim 1, wherein the seat belt comprises:
   a webbing;
   a winding unit including a spool configured to wind the webbing; and
   a spring configured to urge the spool in a direction in which the webbing is wound.

8. The control device according to claim 7, wherein the seat belt mechanism comprises:
   a motor disposed on a side of the spool.

9. The control device according to claim 2, wherein the seat belt comprises:
   a webbing;
   a winding unit including a spool configured to wind the webbing; and
   a spring configured to urge the spool in a direction in which the webbing is wound.

10. The control device according to claim 9, wherein the seat belt mechanism comprises:
    a motor disposed on a side of the spool.

11. The control device according to claim 3, wherein the seat belt comprises:
    a webbing;
    a winding unit including a spool configured to wind the webbing; and
    a spring configured to urge the spool in a direction in which the webbing is wound.

12. The control device according to claim 11, wherein the seat belt mechanism comprises:
a motor disposed on a side of the spool.

13. A control device for a seat belt of a vehicle, the control device comprising:
a seat belt mechanism configured to retract the seat belt with a driving force of a motor;
a camera configured to detect a departure of the vehicle from a lane;
a vehicle speed sensor configured to measure a vehicle speed of the vehicle;
a load sensor configured to measure a load input to the vehicle;
a pretensioner that retracts the seat belt earlier than the seat belt mechanism does when the load measured by the load sensor exceeds a prescribed load; and
an electronic control unit configured to:
lower the prescribed load in response to the camera detecting the departure of the vehicle from the lane; and
operate the seat belt mechanism in response to determining both a first condition and a second condition are satisfied,
the first condition being a condition that the camera detects the departure of the vehicle from the lane, and the second condition being a condition that the vehicle speed measured by the vehicle speed sensor is equal to or higher than a prescribed speed; and
the electronic control unit being configured not to operate the seat belt mechanism in response to determining the first condition is satisfied and the second condition is not satisfied.

14. The control device according to claim 13, wherein the seat belt comprises:
a webbing;
a winding unit including a spool configured to wind the webbing; and
a spring configured to urge the spool in a direction in which the webbing is wound.

15. The control device according to claim 14, wherein the seat belt mechanism comprises:
a motor disposed on a side of the spool.

16. A control device for a seat belt of a vehicle, the control device comprising:
a seat belt mechanism configured to retract the seat belt with a driving force of a motor;
a camera configured to detect a departure of the vehicle from a lane;
a radar device configured to detect presence or absence of a structure outside the lane;
a load sensor configured to measure a load input to the vehicle;
a pretensioner that retracts the seat belt earlier than the seat belt mechanism does when the load measured by the load sensor exceeds a prescribed load; and
an electronic control unit configured to:
lower the prescribed load in response to the camera detecting the departure of the vehicle from the lane; and
operate the seat belt mechanism in response to determining both a first condition and a second condition are satisfied,
the first condition being a condition that the camera detects the departure of the vehicle from the lane, and the second condition being a condition that the radar device detects the structure;
the electronic control unit being configured not to operate the seat belt mechanism in response to determining the first condition is satisfied and the second condition is not satisfied.

17. The control device according to claim 16, wherein the seat belt comprises:
a webbing;
a winding unit including a spool configured to wind the webbing; and
a spring configured to urge the spool in a direction in which the webbing is wound.

18. The control device according to claim 17, wherein the seat belt mechanism comprises:
a motor disposed on a side of the spool.

19. The control device according to claim 2, wherein the electronic control unit is configured to operate the seat belt mechanism in response to determining the first condition and the second condition are satisfied, and the third condition is not satisfied.

20. The control device according to claim 5, wherein the electronic control unit is configured to operate the seat belt mechanism in response to determining the first condition and the second condition are satisfied, and the third condition is not satisfied.

* * * * *